(12) United States Patent
Fukumoto

(10) Patent No.: US 9,080,698 B2
(45) Date of Patent: Jul. 14, 2015

(54) CLAMP

(75) Inventor: Mitsuru Fukumoto, Utsunomiya (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/113,112

(22) PCT Filed: Apr. 9, 2012

(86) PCT No.: PCT/JP2012/002462
§ 371 (c)(1),
(2), (4) Date: Dec. 12, 2013

(87) PCT Pub. No.: WO2012/147289
PCT Pub. Date: Nov. 1, 2012

(65) Prior Publication Data
US 2014/0091182 A1  Apr. 3, 2014

(30) Foreign Application Priority Data

Apr. 28, 2011  (JP) ................................. 2011-100412

(51) Int. Cl.
*F16L 3/22* (2006.01)
*F16L 3/237* (2006.01)
(Continued)

(52) U.S. Cl.
CPC ............... *F16L 3/237* (2013.01); *F16L 3/2235* (2013.01); *F16B 21/071* (2013.01)

(58) Field of Classification Search
CPC ........... F16L 3/10; F16L 3/2235; F16L 3/237; B60R 16/0215
USPC ........ 248/68.1, 65, 73, 74.1, 74.2, 74.3, 74.4, 248/689; 285/903; 174/68.1; 136/106; 138/106
See application file for complete search history.

(56) References Cited

U.S. PATENT DOCUMENTS 4,840,333 A * 6/1989 Nakayama ................... 248/68.1
7,328,873 B2   2/2008 Suzuki et al.
(Continued)

FOREIGN PATENT DOCUMENTS

CN   1621724 A   6/2005
CN  101482201 A   7/2009
(Continued)

OTHER PUBLICATIONS

PCT, "International Search Report for PCT/JP2012/002461", Oct. 26, 2012.
(Continued)

*Primary Examiner* — Todd M Epps
(74) *Attorney, Agent, or Firm* — Manabu Kanesaka

(57) ABSTRACT

A clamp for attaching a pipe with a narrow width portion to a support member, includes a first member including a first concave portion adapted to be connected to the support member; and a second member whose base end is hinge-connected to the first member and whose front end is selectively engaged with the first member. The second member includes a second concave portion facing the first concave portion and defines a housing portion receiving the narrow portion together with the first concave portion in a state wherein the front end is engaged with the first member. The first concave portion and the second concave portion support the narrow portion in a posture wherein the first radial direction is orthogonal to a direction in which the first member and the second member face each other, and abut against a portion in the first radial direction of the narrow portion.

10 Claims, 10 Drawing Sheets

(51) Int. Cl.
*F16L 3/223* (2006.01)
*F16B 21/07* (2006.01)

(56) References Cited

U.S. PATENT DOCUMENTS

| | | | |
|---|---|---|---|
| 8,672,276 B2 * | 3/2014 | Fukumoto | 248/67.5 |
| 8,708,289 B2 * | 4/2014 | Allenbach et al. | 248/68.1 |
| 2005/0184524 A1 * | 8/2005 | Stravitz | 285/903 |
| 2007/0246614 A1 * | 10/2007 | Allmann et al. | 248/65 |
| 2009/0140108 A1 | 6/2009 | Faied | |

FOREIGN PATENT DOCUMENTS

| | | |
|---|---|---|
| JP | S63-29982 U | 2/1988 |
| JP | H04-036191 U | 3/1992 |
| JP | H06-074664 U | 10/1994 |
| JP | 2008-291873 A | 12/2008 |
| JP | 2009-192002 A | 8/2009 |
| JP | 2011-133003 A | 7/2011 |

OTHER PUBLICATIONS

China Patent Office, "Office Action for CN 201280032536.0," Dec. 3, 2014.

* cited by examiner

9,080,698 B2

CLAMP

RELATED APPLICATIONS

The present application is National Phase of International Application No. PCT/JP2012/002462 filed Apr. 9, 2012 and claims priority from Japanese Application No. 2011-100412, filed Apr. 28, 2011.

FIELD OF TECHNOLOGY

The present invention relates to a clamp, and more specifically, relates to a pipe clamp attaching a filler pipe and the like to a vehicle body panel.

BACKGROUND ART

As for a clamp for attaching a pipe such as the filler pipe and the like to a support member such as the vehicle body panel and the like, there is a clamp including a first member attached to the support member, and a second member turnably provided in the first member; preventing the second member from turning by connecting the first member and the second member; and clamping the pipe between the first member and the second member (for example, Patent Document 1).

PRIOR ART DOCUMENT

Patent Document

Patent Document 1: Japanese Utility Model Publication No. S63-29982

SUMMARY OF THE INVENTION

Problems to be Solved by the Invention

In such a clamp, if one portion of the pipe to be clamped is deformed in one radial direction; a narrow portion whose cross-sectional surface has a non-circular shape is formed; and the narrow portion is clamped by the clamp, a rotation around an axis line direction of the pipe can be prevented so as to support the pipe further stably. However, in a case of forming the clamp in the aforementioned fashion, when the pipe is displaced (misaligned) in a thrust direction, a wide portion other than the narrow portion of the pipe proceeds into the clamp, and the first member and the second member are expanded by the pipe, so that there may occur a problem that a connection between both members may be disrupted. Namely, by the movement of the pipe in the thrust direction, there is a possibility that the retention of the pipe by the clamp may be released.

The present invention is made in view of the aforementioned backgrounds, and an object of the present invention is to enhance rigidity relative to the movement of the pipe in the thrust direction in the clamp which supports the pipe, including the narrow portion where a width in one radial direction is narrowed at one portion in a longitudinal direction, at the narrow portion.

Means for Solving the Problems

In order to solve the aforementioned problem, the present invention is a clamp (1) for attaching a pipe (200), including a narrow portion (203) where a width at least in a first radial direction is narrowed at one portion in a longitudinal direction, to a support member (205). The clamp (1) comprises a first member (2) including a first concave portion (12) and connecting to the support member; and a second member (3) whose base end is hinge-connected to the first member and whose front end is selectively engaged with the first member, and including a second concave portion (81) facing the first concave portion in a state wherein the aforementioned end is engaged with the first member, and defining a housing portion receiving the narrow portion together with the first concave portion. The first concave portion and the second concave portion support the narrow portion in a posture wherein the first radial direction is orthogonal to a direction in which the first member and the second member face each other, and abut against a portion in the first radial direction of the narrow portion.

According to the configuration, the first radial direction of the narrow portion is orthogonal to the direction in which the first member and the second member face each other, and the first and second concave portions abut against the portion in the first radial direction of the narrow portion, so that a pipe is displaced in a thrust direction relative to a clamp, and even if the other wide portion other than the narrow portion of the pipe proceeds into the first concave portion and the second concave portion, the pipe applies a load to the first member and the second member in a direction orthogonal to the direction in which the first member and the second member face each other, and does not directly apply the load in the direction in which the first member and the second member face each other so as to reduce an effect on an engagement between the first member and the second member.

Also, in another aspect of the present invention, the first concave portion extends in the longitudinal direction of the pipe and is communicated with both end faces of the first member; the second concave portion extends in the longitudinal direction of the pipe and is communicated with both end faces of the second member; and the first concave portion and the second concave portion face the narrow portion through a void at both end portions in an extending direction, and are formed in a shape abutting against the portion in the first radial direction of the narrow portion at an intermediate portion in the extending direction.

According to the configuration, when the pipe is displaced relative to the clamp in the thrust direction, and the other wide portion other than the narrow portion of the pipe proceeds into the first concave portion and the second concave portion, a portion (a portion applying the load) in which the pipe contacts with the first member and the second member is disposed in center sides of the first member and the second member so as to reduce a twist of the first member and the second member.

Also, in another aspect of the present invention, the first member includes a first elastic claw (57) provided with a first projecting piece portion (58) with flexibility provided in a portion facing the end of the second member to project to the aforementioned second member side, and a first claw portion (59) provided in an end of the first projecting piece portion to project. Also, the second member includes a second elastic claw (93) provided with a second projecting piece portion (94) with flexibility provided in the end of the second member to project to the aforementioned first member side, and a second claw portion (95) provided in an end of the second projecting piece portion to project. The first claw portion of the first elastic claw and the second claw portion of the second elastic claw are mutually caught selectively, so that the second member is selectively engaged with the first member.

According to the configuration, in a case wherein a relative position (an angle) between the first member and the second member is displaced, the first projecting piece portion and the second projecting piece portion tilt so as to maintain the engagement of the first claw portion and the second claw portion.

Also, in another aspect of the present invention, the first member includes a plurality of first elastic claws along a direction corresponding to the longitudinal direction of the pipe, and the second member includes a plurality of second elastic claws in a portion corresponding to the plurality of first elastic claws.

According to the configuration, the pluralities of first elastic claws and second elastic claws are caught on so as to strengthen the engagement between the first member and the second member.

Also, in another aspect of the present invention, the second claw portion protrudes in two opposite directions from the end of the second projecting piece portion to have two non-return faces. Also, the first elastic claws are provided in such a way as to sandwich by two relative to one second elastic claw, and two first claw portions are respectively caught on the two non-return faces of the second claw portion.

According to the configuration, the first elastic claws and the second elastic claws are maintained to be caught on more reliably.

Also, in another aspect of the present invention, in either one of an end portion of the second member or a portion of the first member facing the end portion, there is provided a key (60) to project, and in the other side, there is formed a fitting hole (97) into which the aforementioned key is fitted.

According to the configuration, the key and the fitting hole are fitted so as to prevent a relative displacement (a position misalignment) between the first member and the second member.

Effect of the Invention

According to the aforementioned configuration, in the clamp which supports the pipe, including the narrow portion where the width is narrowed in one radial direction at one portion in the longitudinal direction, at the width direction, rigidity relative to a movement in the thrust direction of the pipe can be enhanced.

BEST MODES OF CARRYING OUT THE INVENTION

Hereinafter, with reference to drawings, an embodiment of the present invention will be explained in detail, which is applied to a pipe clamp for attaching a filler pipe and a breather pipe to a vehicle body panel. In the following explanation, the embodiment will be explained based on coordinate axes shown in FIG. 1.

Figure 1:
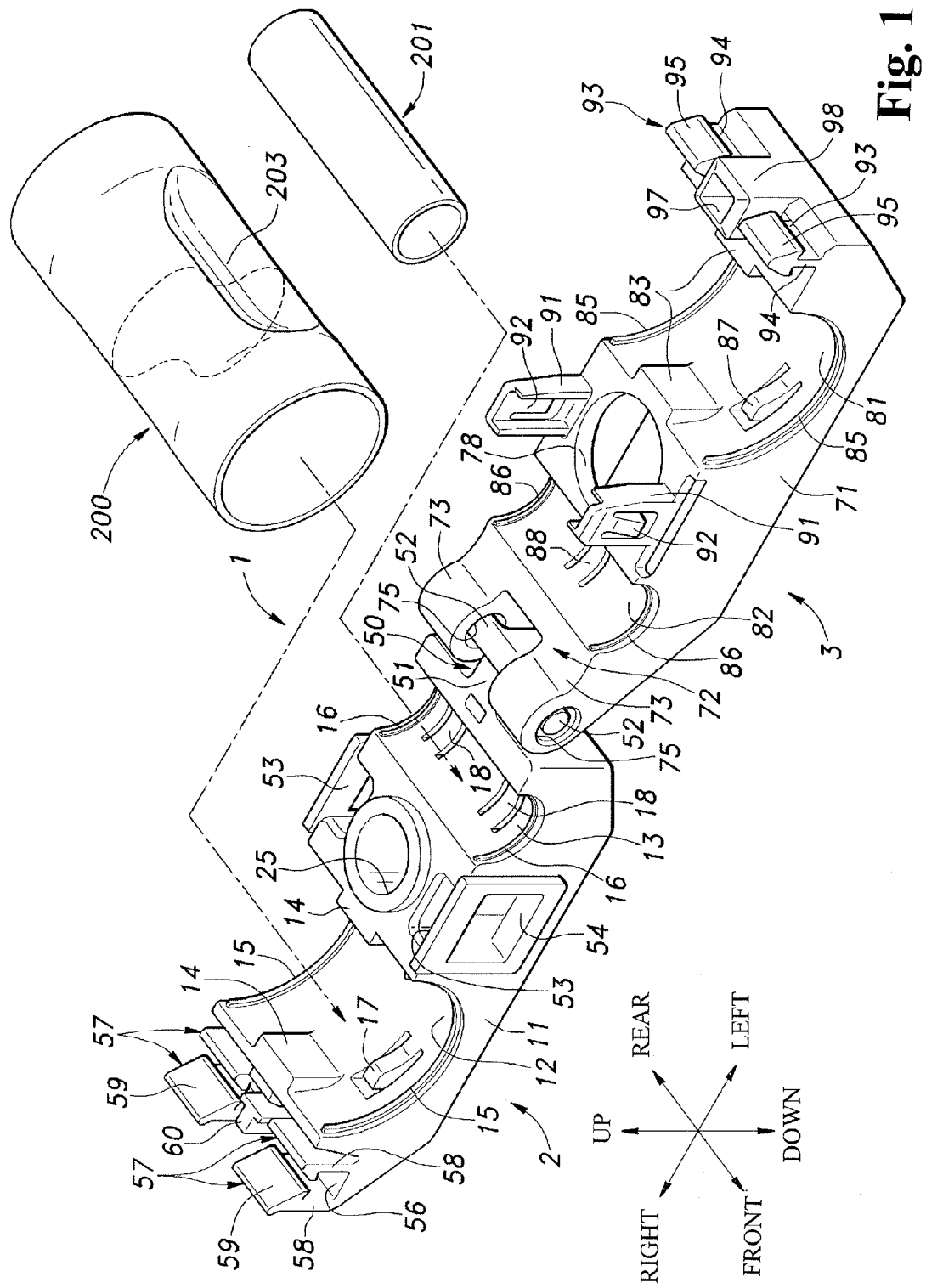
FIG. 1 is a perspective view showing a base member and a lid member of a pipe clamp.
Figure 2:
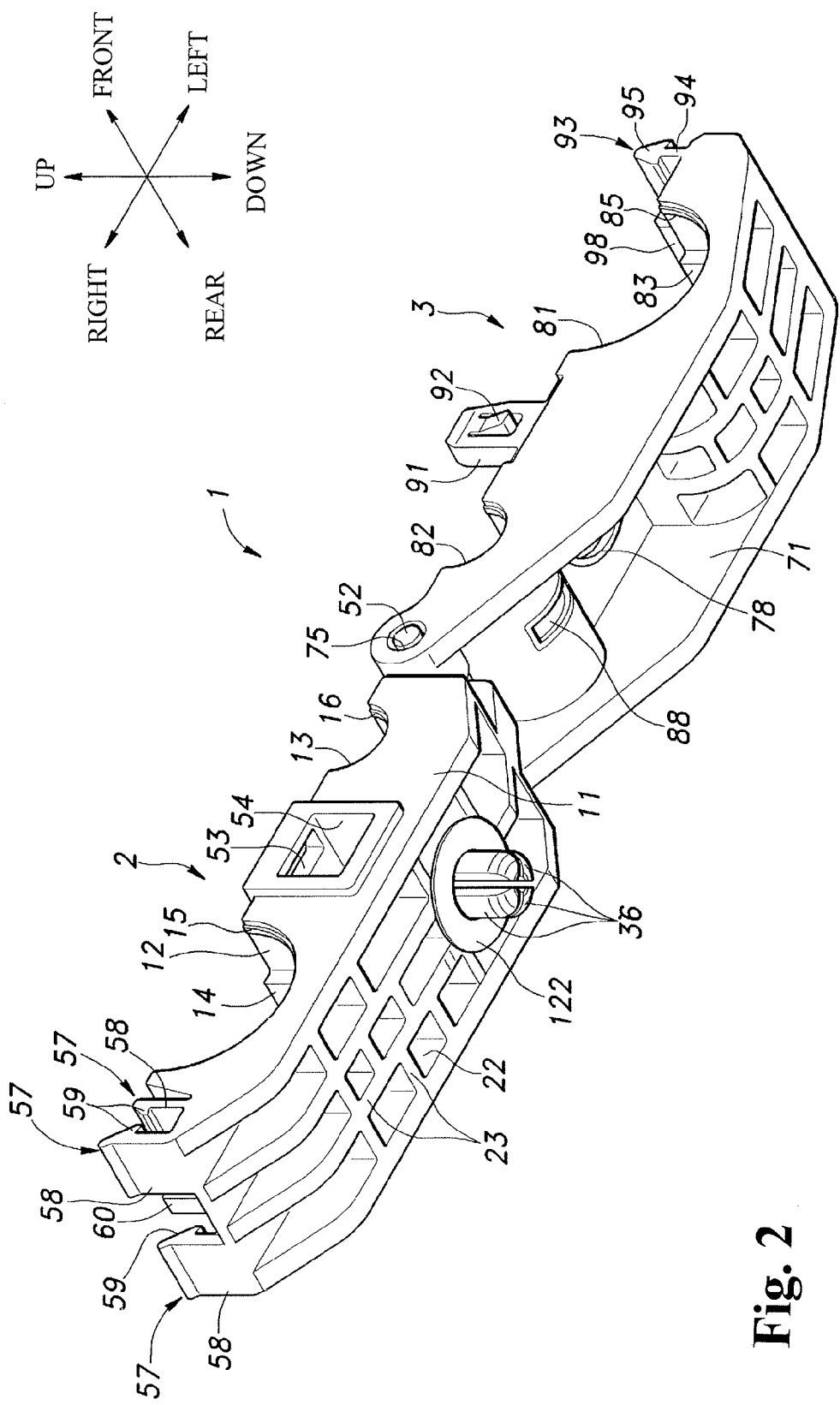
FIG. 2 is a perspective view showing the base member and the lid member of the pipe clamp.
Figure 3:
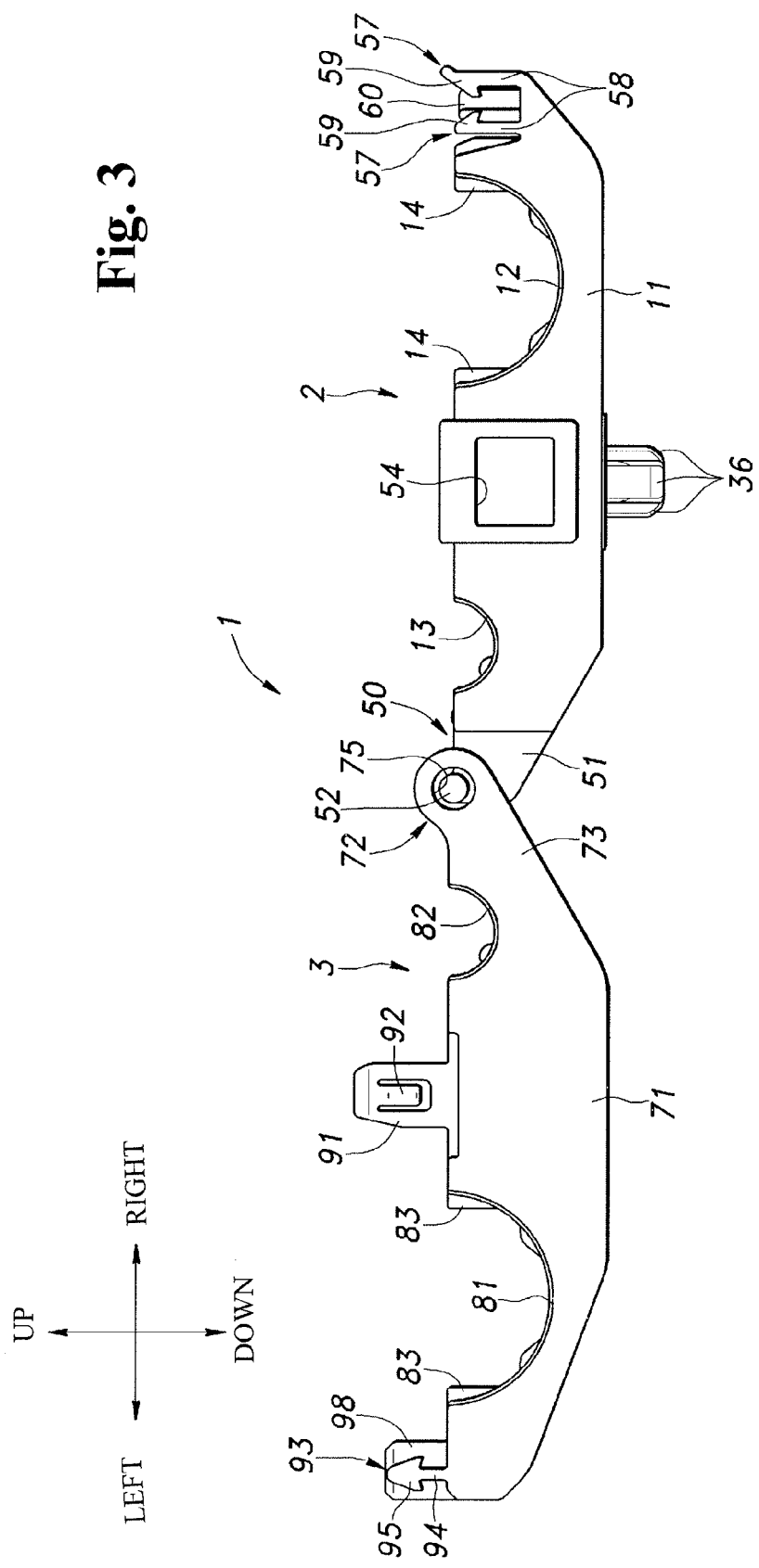
FIG. 3 is a side view showing the base member and the lid member of the pipe clamp.

As shown in FIG. 1 to FIG. 3, a pipe clamp (a clamp) 1 includes a base member (a first member) 2; a lid member (a second member) 3 turnably supported in the base member 2; and a pin member 4 (see FIG. 6) held in the base member 2, respectively formed by a resin material as a main component. The pipe clamp 1 supports a filler pipe 200 and a breather pipe 201, which have a tubular body, between the base member 2 and the lid member 3, and the base member 2 is attached to a surface of a vehicle body panel 205 as a support member so as to fix the filler pipe 200 and the breather pipe 201 to the vehicle body panel 205.

The filler pipe 200 is a pipe which connects a fueling opening of an automobile to a fuel tank, and has a circular cross-sectional surface in a large part. However, one portion in a longitudinal direction is crushed in a radial direction (in the present embodiment, a right-and-left direction, and a direction having a narrow width is called a first radial direction) so as to form a narrow portion 203 having a non-circular shape where the width is narrowed in the right-and-left direction. In the narrow portion 203, right-and-left lateral portions thereof extend roughly in an up-and-down direction. However, in an upper portion and a lower portion thereof, an outer circumferential face having an arc shape is maintained. The breather pipe 201 is a pipe provided roughly parallel to the filler pipe 200 in order to carry out degassing inside the fuel tank at a fueling time, and a cross-sectional surface thereof has a circular shape. The vehicle body panel 205 is a panel having a flat plate shape, and there is formed a locking hole 206 having a circular shape.

The base member 2 includes a main body portion 11 extending in the right-and-left direction, and in an upper portion of the main body portion 11, a first pipe holding portion (a first concave portion) 12 receiving a lower half portion of the narrow portion 203 of the filler pipe 200 and a second pipe holding portion 13 receiving a lower half portion of the breather pipe 201 are concaved. The first pipe holding portion 12 and the second pipe holding portion 13 respectively include a cross-sectional surface having approximately a semicircular shape; extend in a front-back direction; and are communicated with a front face and a back face of the main body portion 11. The first pipe holding portion 12 includes convex portions 14 protruding to a center side of the first pipe holding portion 12 in right-and-left lateral portions of an intermediate portion in the front-back direction thereof. By the convex portions 14, a width of the first pipe holding portion 12 narrows in a right-and-left direction of the intermediate portion in the front-back direction. Incidentally, a bottom portion of the intermediate portion in the front-back direction of the first pipe holding portion 12 is formed in a circumferential face.

Also, on a surface of the first pipe holding portion 12 and the second pipe holding portion 13, there are formed projecting pieces 15 and 16 extending in the right-and-left direction. Also, on the surface of the first pipe holding portion 12 and the second pipe holding portion 13, there are formed pressing pieces 17 and 18 cut out by a U-shaped slit, and provided with a convex portion protruding to an inner side of the first pipe holding portion 12 or the second pipe holding portion 13 in an end portion thereof. The pressing pieces 17 and 18 have flexibility, and can sway. The projecting pieces 15 and 16, and the pressing pieces 17 and 18 are provided for the purpose of enhancing a firmly attaching property to the filler pipe 200 and the breather pipe 201.

As shown in FIG. 2, in a lower portion of the main body portion 11, there is provided a plurality of cut-out portions 22 opening downward to be concaved in appropriate portions, and there is formed a plurality of ribs 23 in such a way as to partition each cut-out portion 22. A lower end of each rib 23 is disposed on a virtual planar surface which approximately becomes one surface, and the main body portion 11 can abut against a flat planar surface (a plate material and the like) in the lower portion.

Figure 4:
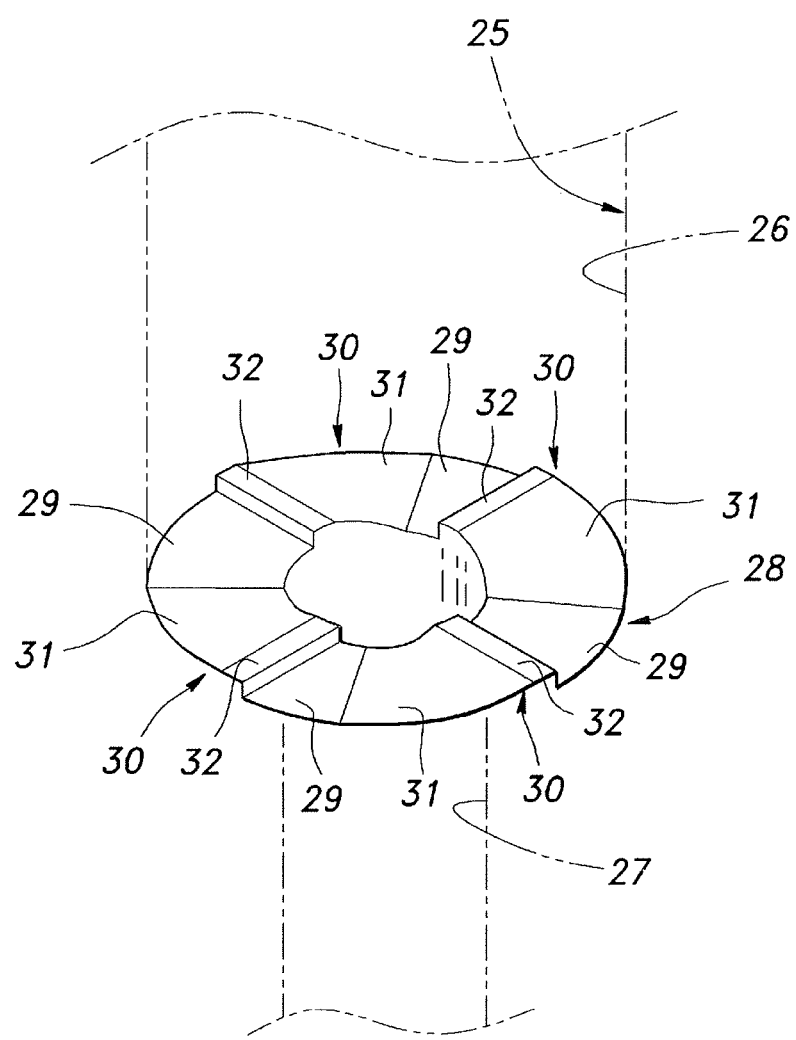
FIG. 4 is a perspective view showing a pin hole of the base member.

In an intermediate portion in a right-and-left direction of the main body portion 11, and between the first pipe holding portion 12 and the second pipe holding portion 13, there is formed a pin hole 25 extending in an up-and-down direction and communicated with an upper face and a lower face of the main body portion. As shown in FIG. 4 (FIG. 6), the pin hole 25 has a circular cross-sectional surface, and an upper half portion 26 expands in diameter concentrically relative to a lower half portion 27, and in a boundary portion thereof, there is formed an annular step portion 28 facing upward.

As shown in FIG. 4, the step portion 28 comprises four guide convex portions 30 protruding toward an upper side on a bottom face 29 facing the upper side thereof in a circumferential direction at an equal interval (a 90-degree interval). Each guide convex portion 30 includes an inclined surface 31 protruding to the upper side from the bottom face 29 as heading in a counterclockwise direction in the circumferential direction of the pin hole 25 viewed from the upper side; and an upper face 32 extending in the counterclockwise direction in the circumferential direction parallel to the bottom face 29 from an upper end of the inclined surface 31. An end portion, which differs from an inclined surface 31 side on an upper face, continues to the bottom face 29 through a vertical planar surface.

In a circumferential edge portion of a lower end portion of the pin hole 25, there is formed an annular groove-like cut-out portion 35 in such a way as to surround the pin hole 25 concentrically. From the circumferential edge portion of the lower end portion of the pin hole 25, and an inside portion of a portion forming the cut-out portion 35, there are formed four leg piece portions 36 protruding toward a lower side along the circumferential direction of the pin hole 25 at an equal interval. Each leg piece portion 36 functions as a grommet which is inserted into the locking hole 206 formed in the vehicle body panel 205. In a portion facing a center axis side of the pin hole 25 of each leg piece portion 36, there is formed a protrusion portion 37 including an inclined surface facing the upper side obliquely in such a way as to protrude to the center axis side of the pinhole 25 as heading for an end (a lower end). Furthermore, on each protrusion portion 37, there is formed a claw portion 38 protruding to the center axis side of the pin hole 25. Each claw portion 38 includes a non-return face facing the lower side in a lower portion thereof. Each leg piece portion 36 has flexibility, and can tilt in a radial direction of the pin hole 25.

In a left end portion of the main body portion 11, there is provided a hinge axis portion 50. The hinge axis portion 50 includes an axis support portion 51 protruding to a left side from a left end face of the main body portion 11; and a cylindrical hinge axis 52 protruding forward and backward from an end portion of the axis support portion 51.

On front and back sides of the pin hole 25 in the upper face of the main body portion 11, there are provided two connection holes 53 concaved and opened toward the upper side. In each connection hole 53, a width of an opening portion at an upper end is formed narrowly on a different level relative to an inside. Namely, the connection hole 53 includes a locking portion in an upper end opening portion. The inside of the connection hole 53 is communicated with a front face or a back face of the base member 2 through an operation opening 54.

In a right end portion of the upper portion of the main body portion 11, there is formed a concave portion 56 concaved to the lower side more than the upper face. On a bottom face of the concave portion 56, four first elastic claws 57 are disposed in such a way as to form a pair two by two. Each first elastic claw 57 includes a first projecting piece portion 58 protruding upward from the bottom portion of the concave portion 56 and having flexibility; and a first claw portion 59 provided to project in an end portion of the first projecting piece portion 58 and including a downward-facing non-return face. The first elastic claw 57 respectively forming a pair is disposed such that mutual first claw portions 59 face each other in a right-and-left direction. Also, two pairs of first elastic claws 57 forming a pair are disposed to be separated from each other on a front side and a back side of the concave portion 56. In between in a front-back direction of the two pairs of first elastic claws 57 of the concave portion 56, there is provided a columnar key 60 protruding upward.

As shown in FIG. 1 to FIG. 3, the lid member 3 includes a main body portion 71 extending in a right-and-left direction, and in a right end portion of the main body portion 71, there is formed a hinge bearing portion 72.

The hinge bearing portion 72 includes two fork portions 73 separated from each other in a front-back direction from the right end portion of the main body portion 71 and protruding to a right side; and a bearing hole 75 provided in a protrusion end portion of each fork portion 73. The bearing hole 75 has an axis line extending in the front-back direction so as to be concentrically disposed. In each bearing hole 75, the hinge axis 52 of the base member 2 is axially supported. Thereby, the lid member 3 is turnably supported in the base member 2 through a hinge portion comprising the bearing hole 75 and the hinge axis 52 (is hinge-connected).

As shown in FIG. 1, approximately in a central part in the right-and-left direction of an upper portion of the main body portion 71, there is formed a circular through-hole 78 penetrating in an up-and-down direction. The through-hole 78 is disposed coaxially with the pin hole 25 in a state wherein the lid member 3 is closed relative to the base member 2 (states shown in FIG. 6 and FIG. 7, and a state wherein the lid member 3 is positioned on an upper side of the base member 2).

In a state shown in FIG. 1, in a left side of the through-hole 78 in the upper portion of the main body portion 71, there is provided a third pipe holding portion 81 concaved to receive an upper half portion of the narrow portion 203 of the filler pipe 200; and in a right side, there is provided a fourth pipe holding portion 82 concaved to receive an upper half portion of the breather pipe 201. The third pipe holding portion 81 and the fourth pipe holding portion 82 respectively have a cross-sectional surface having approximately a semicircular shape;

extend in a front-back direction; and are communicated with a front face and a back face of the main body portion 71. The third pipe holding portion 81 includes convex portions 83 protruding to a center side of the third pipe holding portion 81 in right-and-left lateral portions of an intermediate portion in the front-back direction thereof. By the convex portions 83, a width of the third pipe holding portion 81 narrows in a right-and-left direction of the intermediate portion in the front-back direction. Incidentally, a bottom portion of the intermediate portion in the front-back direction of the third pipe holding portion 81 is formed in a circumferential face. In the state wherein the lid member 3 is closed relative to the base member 2, the third pipe holding portion 81 faces the first pipe holding portion 12, and the fourth pipe holding portion 82 faces the second pipe holding portion 13.

On a surface of the third pipe holding portion 81 and the fourth pipe holding portion 82, there are formed projecting pieces 85 and 86 extending in the right-and-left direction. Also, on the surface of the third pipe holding portion 81 and the fourth pipe holding portion 82, there are formed pressing pieces 87 and 88 cut out by a U-shaped slit communicated with a lower portion of the main body portion 71, and provided with a convex portion protruding to an inner side of the third pipe holding portion 81 and the fourth pipe holding portion 82 in an end portion thereof. The pressing pieces 87 and 88 have flexibility, and can sway. The projecting pieces 85 and 86, and the pressing pieces 87 and 88 are provided for the purpose of enhancing a firmly attaching property to the filler pipe 200 and the breather pipe 201.

On front and back sides of the through-hole 78 in the upper portion of the main body portion 71, there are provided two connection pieces 91 projecting toward the upper side. In a lateral portion of each connection piece 91, there is formed a claw portion 92 cut out by a U-shaped slit. The claw portion 92 is provided to be capable of tilting relative to the connection piece 91, and by elastically deforming, the claw portion 92 can protrude and enter relative to the connection piece 91.

In a left end portion of the upper portion of the main body portion 71, there are provided two second elastic claws 93 separating from each other in the front-back direction. Each second elastic claw 93 includes a second projecting piece portion 94 extending upward and having flexibility; and a second claw portion 95 protruding to a left side and a right side from an end of the second projecting piece portion 94 and having an arrowhead shape forming two non-return faces. In a portion between the two second elastic claws 93 in the front-back direction, there is provided a wall portion 98 having a square cylindrical shape including a fitting hole 97 opening upward in an inside. There is formed a void between the wall portion 98 and each second elastic claw 93, and the wall portion 98 and each second elastic claw 93 is not connected.

Figure 5:
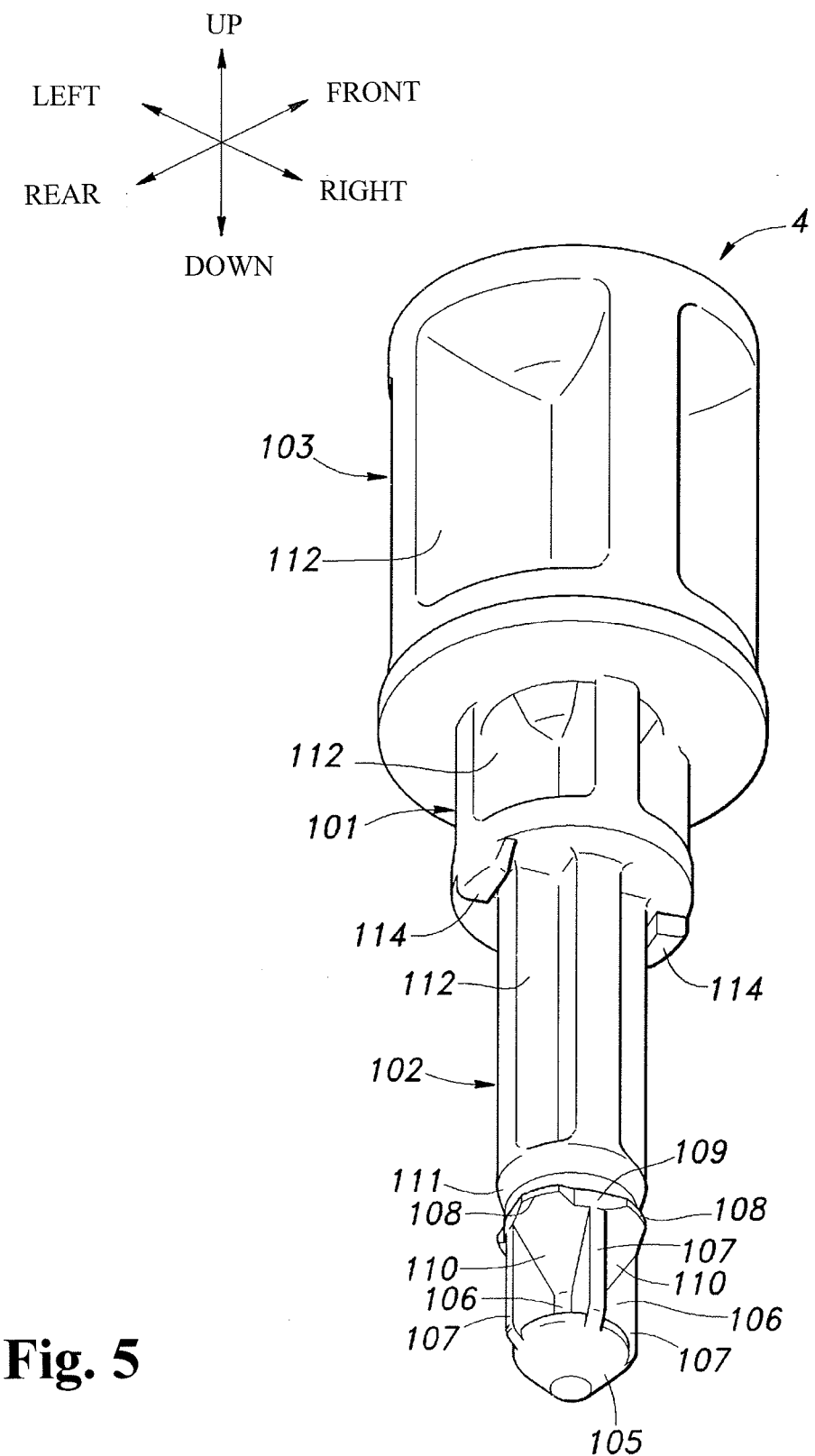
FIG. 5 is a perspective view showing a pin member.

As shown in FIG. 5, the pin member 4 includes a columnar intermediate axis portion 101; a small diameter axis portion 102 provided in the same axis in one end of the intermediate axis portion 101 and having a diameter smaller than that of the intermediate axis portion 101; and a large diameter axis portion 103 provided on the other end side of the intermediate axis portion 101. An outer diameter of the small diameter axis portion 102 is formed smaller than an inner diameter of the lower half portion 27 of the pin hole 25. An outer diameter of the intermediate axis portion 101 is formed smaller than an inner diameter of the upper half portion 26 of the pin hole 25, and is formed larger than the inner diameter of the lower half portion 27. An outer diameter of the large diameter axis portion 103 is formed larger than the inner diameter of the upper half portion 26, and is formed smaller than an inner diameter of the through-hole 78.

The small diameter axis portion 102 includes a conical end portion 105. In an upper side (a base end side) of the end portion 105 of the small diameter axis portion 102, there are provided four concave portions 106 formed in a circumferential direction at an equal interval, and there are provided dividing walls 107 between adjacent concave portions 106. On an upper side (a base end side) of each concave portion 106 of the small diameter axis portion 102, there is provided a locking projecting piece 108 protruding and extending in the circumferential direction. In the locking projecting piece 108, a length in the circumferential direction thereof is formed short compared to a length in the circumferential direction of the concave portion 106, and in a portion (a portion positioned on an upper side of the dividing wall 107) between adjacent locking projecting pieces 108 in the circumferential direction, there is formed a valley portion 109 wherein a circumferential face of the small diameter axis portion 102 is exposed. A portion which becomes a lateral wall on the upper side of each concave portion 106 is formed as an inclined face 110 in such a way as to smoothly continue to a protrusion end of the locking projecting piece 108. In a portion leaving a predetermined interval on an upper side from the locking projecting pieces 108 of the small diameter axis portion 102, there is provided a control wall 111 continuing around the circumferential direction of the small diameter axis portion 102.

On a lower face of the intermediate axis portion 101, there are formed two convex portions 114 protruding downward. Each convex portion 114 is formed in the same shape, and is provided in an asymmetric position wherein an axis line of the intermediate axis portion 101 is a symmetrical axis. Also, on an upper end face of the large diameter axis portion 103, there is formed a tool hole 116 with which a tool (for example, a straight slot screwdriver) can engage. In appropriate portions of the intermediate axis portion 101, the small diameter axis portion 102 and the large diameter axis portion 103, there are formed cut-out portions 112.

Figure 6:
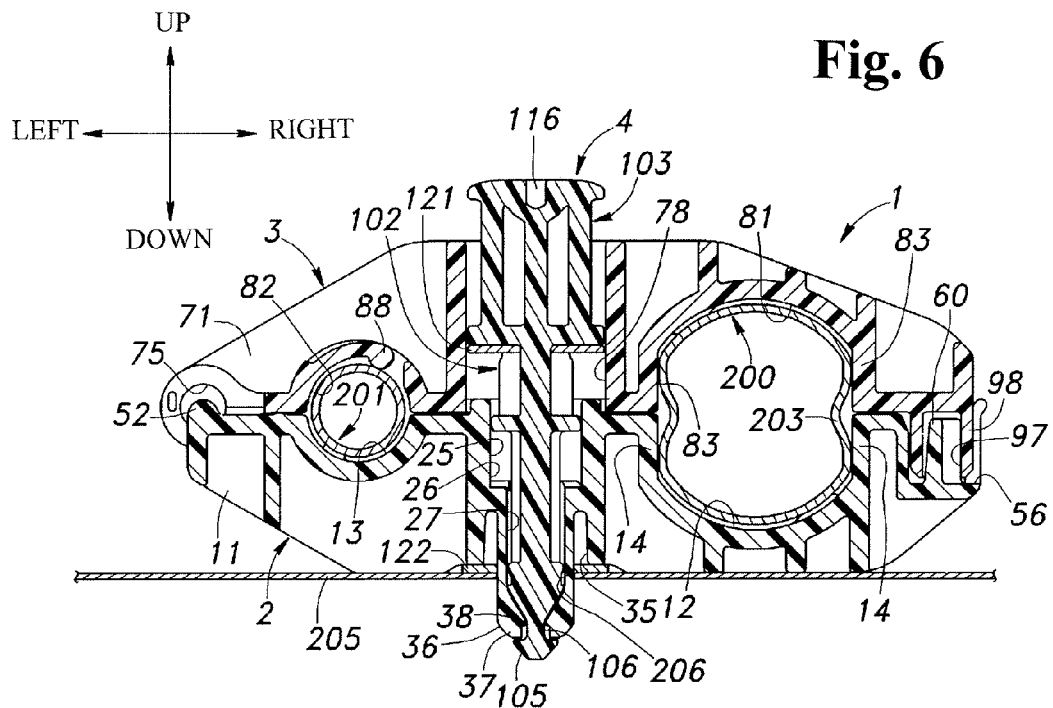
FIG. 6 is a cross-sectional view showing a stage in a middle when a pipe is attached to a vehicle body panel by the pipe clamp.

As shown in FIG. 6, the pin member 4 is inserted on an upper end side of the pin hole 25 from the end portion 105 in the state wherein the lid member 3 is closed relative to the base member 2. Prior to an insertion of the pin member 4 into the pin hole 25, an annular seal member 121 having flexibility is placed in an outer circumferential portion of the intermediate axis portion 101 of the pin member 4. In an outer circumferential portion of each leg piece portion 36, there is placed an annular seal member 122 having flexibility.

Next, using the aforementioned pipe clamp 1, a method attaching the filler pipe 200 and the breather pipe 201 to the vehicle body panel 205, and an attachment structure thereof will be explained.

First, in a state wherein the lid member 3 is open relative to the base member 2, the narrow portion 203 of the filler pipe 200 is disposed inside the first pipe holding portion 12 of the base member 2, and the breather pipe 201 is disposed in the second pipe holding portion 13. At that time, the lower half portion of the narrow portion 203 is disposed inside the first pipe holding portion 12 so that the first radial direction, which is a radial direction wherein the width of the narrow portion 203 is narrow, corresponds to the right-and-left direction. Thereby, right-and-left lateral portions of the lower half portion of the narrow portion 203 abut against the convex portions 14 of the first pipe holding portion 12, and the filler pipe 200 is supported non-rotatably relative to the base member 2.

Next, the lid member 3 is turned relative to the base member 2 in such a way as to cover an upper portion of the base member 2 by the lid member 3. Thereby, the upper half portion of the filler pipe 200 is disposed inside the third pipe holding portion 81, and the upper half portion of the breather pipe 201 is disposed inside the fourth pipe holding portion 82. Right-and-left lateral portions of the upper half portion of the narrow portion 203 abut against the convex portions 83 of the third pipe holding portion 81. Also, simultaneously, the first claw portion 59 of the first elastic claw 57 of the base member 2 and the second claw portion 95 of the second elastic claw 93 of the lid member 3 are mutually caught on (engaged). Also, the connection piece 91 of the lid member 3 fits into the connection hole 53 of the base member 2, and the claw portion 92 is caught on the connection hole 53. Thereby, the lid member 3 is fixed relative to the base member 2 (see FIG. 6).

Next, the pin member 4 is inserted into the pin hole 25. In an insertion process of the pin member 4, the end portion 105 of the pin member 4 abuts against the inclined surface of the protrusion portion 37 and the claw portion 38 of each leg piece portion 36. From that state, when the pin member 4 is pushed in further relative to the pin hole 25, each leg piece portion 36 elastically deforms outward in the radial direction of the pin hole 25, and the end portion 105 passes through the claw portion 38. In a state wherein the end portion 105 has passed through the claw portion 38, each leg piece portion 36 attempts to return to an initial state by a restoring force, and the protrusion portion 37 and the claw portion 38 fit into the concave portion 106 (see FIG. 6). Thus, the protrusion portion 37 and the claw portion 38 are locked in the concave portion 106, so that the pin member 4 is held inside the pin hole 25.

Figure 7:
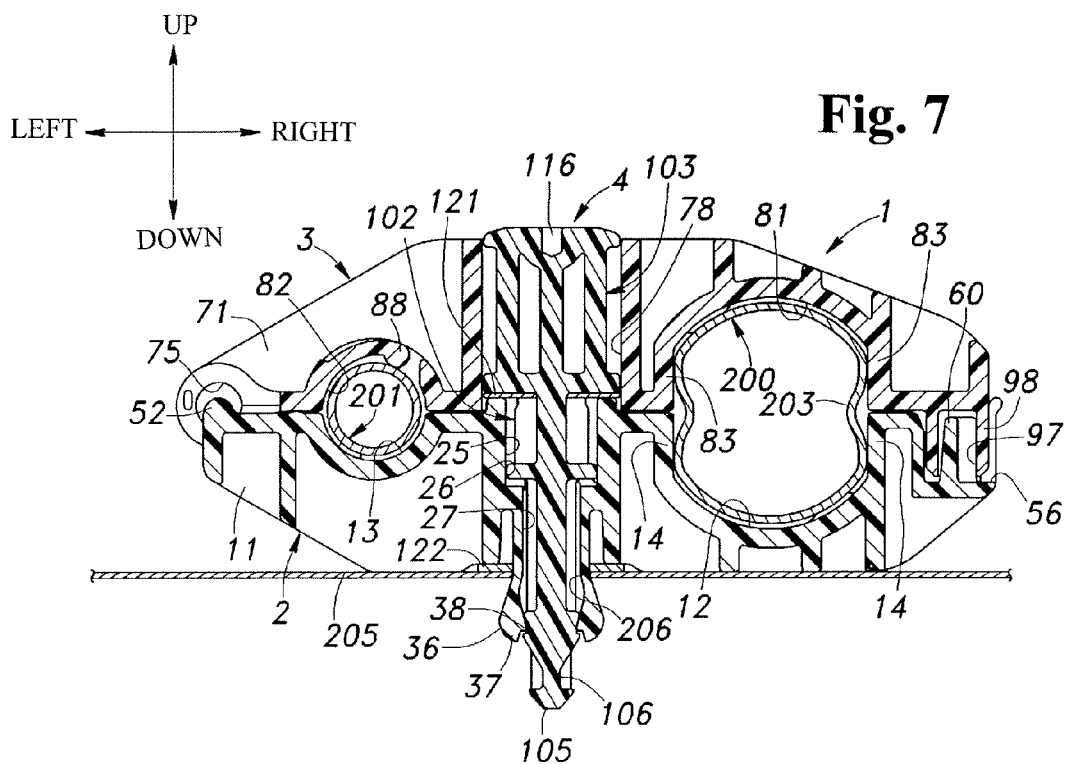
FIG. 7 is a cross-sectional view showing a state wherein the pipe has been attached to the vehicle body panel by the pipe clamp.

Next, four leg piece portions 36 are inserted into the locking hole 206 of the vehicle body panel 205, and a lower portion (the lower end of each rib 23) of the base member 2 abuts against the surface of the vehicle body panel 205. In that state, the large diameter axis portion 103 of the pin member 4 is pressed to a base member 2 side by fingers or the tool. When the pin member 4 moves to an end side of the leg piece portion 36, the protrusion portion 37 and the claw portion 38 of the leg piece portion 36 are pressed against the inclined surface 110 of the pin member 4, and an end portion of each leg piece portion 36 is displaced outward in the radial direction of the pin hole 25. When a movement of the pin member 4 relative to the leg piece portion 36 is carried out further, the claw portion 38 slides on the inclined surface 110, and climbs over the locking projecting piece 108 upward. After that, the convex portion 114 of the pin member 4 abuts against the bottom face 29 of the step portion 28 so as to control the movement of the pin member 4 relative to the leg piece portion 36. In that state, as shown in FIG. 7, the protrusion portion 37 and the claw portion 38 are disengaged from the concave portion 106; the claw portion 38 becomes a state abutting against an outer circumferential face of the small diameter axis portion 102; and the end portion of the leg piece portion 36 is maintained in a state expanding outward in the radial direction of the pin hole 25. Thereby, the leg piece portion 36 is locked in the locking hole 206 so as to prevent the leg piece portion 36 from being disengaged from the locking hole 206. In that state, the claw portion 38 has been locked in the locking projecting piece 108 so as to prevent the pin member 4 from being removed from the pin hole 25.

At that time, the large diameter axis portion 103 of the pin member 4 seals an upper end portion of the pin hole 25 through the seal member 121, and a lower end circumferential edge portion of the pin hole 25 of the base member 2 seals the circumferential edge portion of the locking hole 206 through the seal member 122. Thereby, the locking hole 206 is sealed watertightly.

Next, a method removing the pipe clamp 1 from the vehicle body panel 205 will be explained. First, a tool (for example, a cross slot screwdriver) is engaged with the tool hole 116 of the pin member 4. Then, the pin member 4 is rotated counterclockwise as viewed from above. Thereby, in an up-and-down direction, each claw portion 38 of each leg piece portion 36 is disengaged from a position facing the locking projecting piece 108 of the pin member 4 so as to face the valley portion 109. Simultaneously, the convex portion 114 of the pin member 4 slides on the step portion 28 to the upper face 32 through the inclined surface 31 from the bottom face 29, and the pin member 4 is displaced upward relative to the base member 2. From that state, when the large diameter axis portion 103 is gripped and the pin member 4 is extracted upward relative to the base member 2, the claw portion 38 slides on an end face of the dividing wall 107 so as to reach up to the end portion 105 without being caught on the concave portion 106. Also, in a case wherein the pin member 4 is not attempted to be completely extracted from the base member 2, in a state wherein the claw portion 38 is positioned on the end face of the dividing wall 107, when the pin member 4 is rotated relative to the base member 2, the claw portion 38 is received inside the concave portion 106, and the leg piece portion 36 returns to the initial state. In the above-mentioned state, the leg piece portion 36 is in the initial state (is not displaced outward in the radial direction of the pin hole 25), so that the leg piece portion 36 can be extracted from the locking hole 206.

Next, a method removing the filler pipe 200 and the breather pipe 201 from the pipe clamp 1 will be explained. Both the first elastic claws 57 facing each other in the right-and-left direction are expanded by fingers, the tool, or the like so as to release a state wherein the first claw portion 59 of the first elastic claw 57 is caught on the second claw portion 95 of the second elastic claw 93. Also, the claw portion 92 of the connection piece 91 is entered relative to the connection piece 91 through the operation opening 54 by fingers, the tool, or the like so as to release an engagement between the connection piece 91 and the connection hole 53. Thereby, the lid member 3 can open relative to the base member 2 so as to be capable of removing the filler pipe 200 and the breather pipe 201 from the pipe clamp 1.

Figure 8:
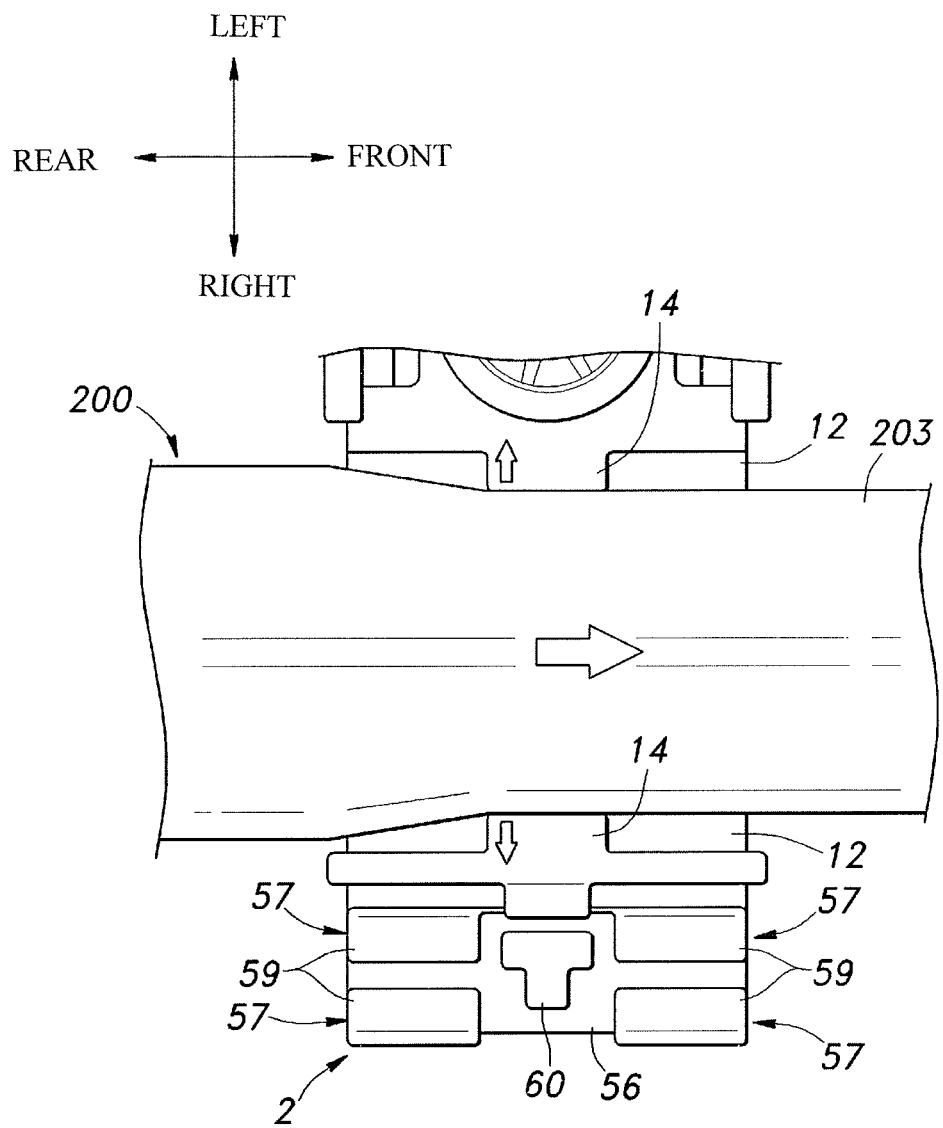
FIG. 8 is a plan view showing a positional relationship between the base member and the pipe.

In the pipe clamp 1 configured as above, the narrow portion 203 is supported in the first pipe holding portion 12 and the third pipe holding portion 81 in such a way that a first direction (the right-and-left direction), which is a direction wherein the width of the narrow portion 203 has been reduced, is orthogonal relative to a direction (the up-and-down direction) wherein the base member 2 and the lid member 3 face each other. Therefore, as shown in FIG. 8, even if the filler pipe 200 is displaced in a thrust direction (the front), and the other wide portion positioned next to the narrow portion 203 of the filler pipe 200 proceeds into the first pipe holding portion 12 and the third pipe holding portion 81, the first pipe holding portion 12 and the third pipe holding portion 81 receive a load so as to expand in the right-and-left direction from the filler pipe 200, so that the first pipe holding portion 12 and the third pipe holding portion 81 will never directly receive a load in the up-and-down direction from the filler pipe 200. Therefore, a load expanding the base member 2 and the lid member 3 in the up-and-down direction is reduced, so that the first elastic claw 57 and the second elastic claw 93 are easily maintained as being caught on.

Also, in the first pipe holding portion 12 and the third pipe holding portion 81, the convex portions 14 and 83 provided in the intermediate portion in the front-back direction abut against the narrow portion 203 from the right-and-left direction, so that when the filler pipe 200 is displaced in the thrust direction, a load applied to the first pipe holding portion 12 and the third pipe holding portion 81 by the filler pipe 200 is applied from a position close to the intermediate portion in the front-back direction so as to prevent a twist in the front-back direction from being applied to the base member 2 and the lid member 3.

Figure 9:
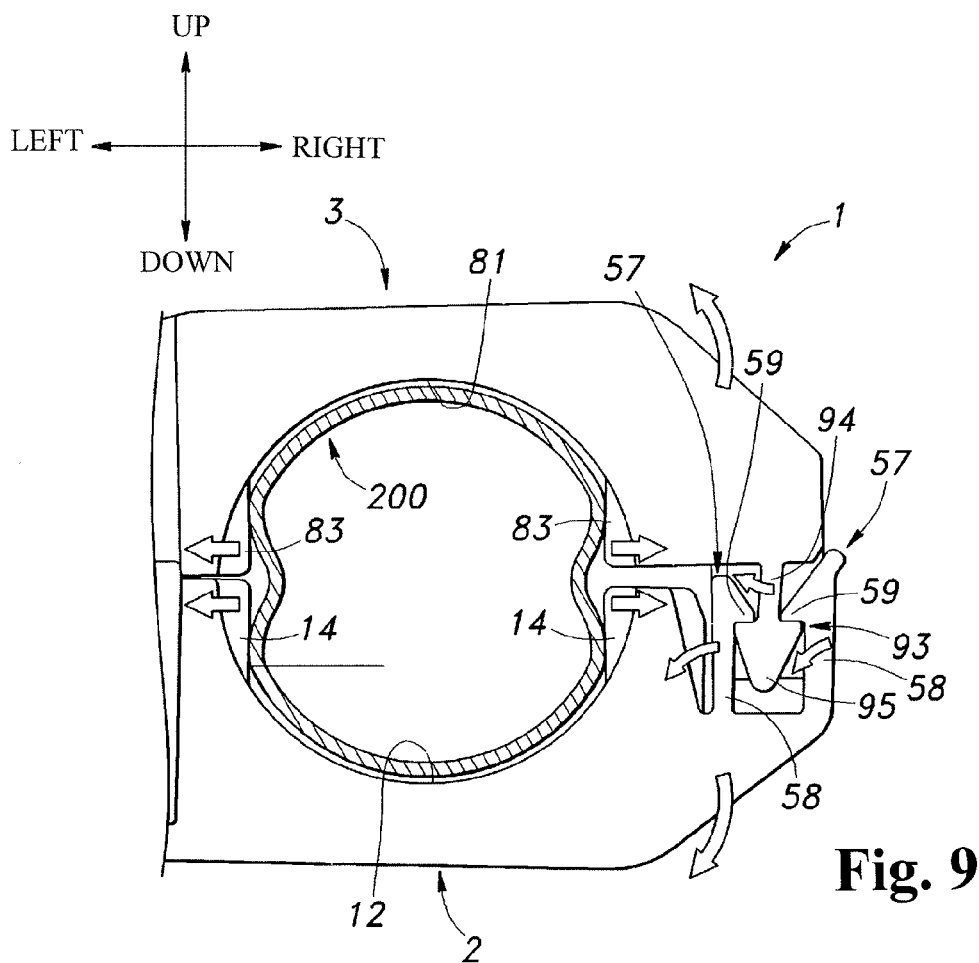
FIG. 9 is a side view showing a deformation of the pipe clamp at a time of receiving a load by the pipe.

Also, when the filler pipe 200 is displaced in the thrust direction, and the first pipe holding portion 12 and the third pipe holding portion 81 are expanded in the right-and-left direction by the filler pipe 200, as shown in FIG. 9, the base member 2 and the lid member 3 attempt to twist as a base point of a portion wherein a thickness in the up-and-down direction is reduced by forming the first pipe holding portion 12 or the third pipe holding portion 81. However, in the first elastic claw 57 and the second elastic claw 93, the first projecting piece portion 58 and the second projecting piece portion 94 tilt so as to maintain the first claw portion 59 and the second claw portion 95 as being caught on. Also, the second claw portion 95 includes the two non-return faces to right and left, and is caught on the first claw portion 59 in such a way as to be clamped, so that even when the first projecting piece portion 58 and the second projecting piece portion 94 tilt, the engagement of the first claw portion 59 and the second claw portion 95 is reliably maintained.

Also, the key 60 is fitted into the fitting hole 97 so as to prevent a relative movement (a position misalignment) between the base member 2 and the lid member 3 in the right-and-left direction and the front-back direction.

Figure 10:
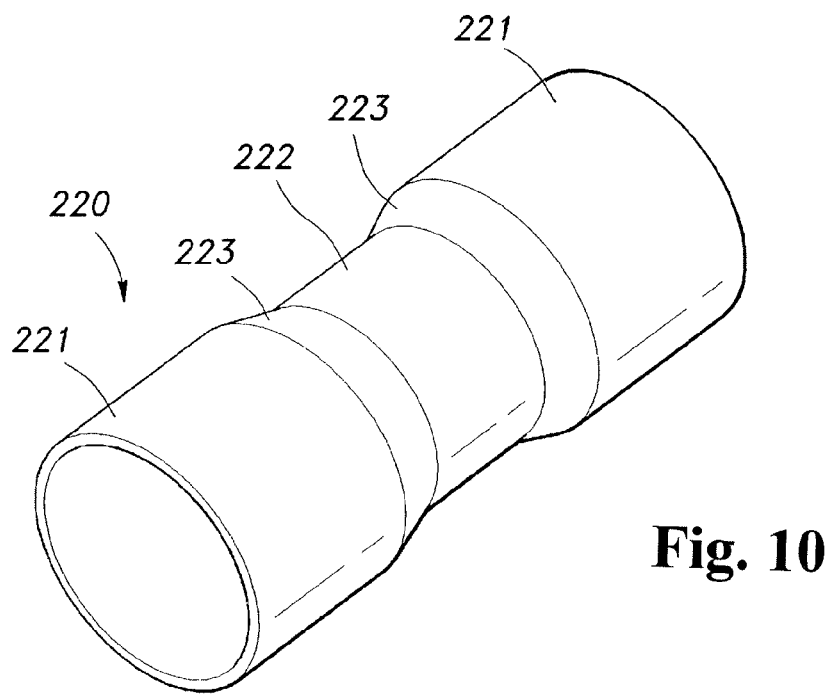
FIG. 10 is a perspective view showing a filler pipe of another embodiment.

The pipe clamp 1 having the aforementioned configuration also can support a filler pipe 220 having a shape as shown in FIG. 10 in place of a pipe crushed in the first radial direction as in the case of the filler pipe 200. The filler pipe 220 includes large diameter portions 221 having a circular shape of a cross-sectional surface forming a large part of the pipe; a narrow portion 222 provided in one portion in a longitudinal direction of the pipe in the same axis as the large diameter portions 221, and having a circular shape of a cross-sectional surface having a diameter smaller than that of the large diameter portions 221; and taper portions 223 provided between both ends of the narrow portion 222 and the large diameter portions 221 and having a circular truncated cone shape whose diameter gradually expands from the narrow portion 222 to the large diameter portions 221. The narrow portion 222 differs from the narrow portion 203, and has a width narrowing at a whole circumference not simply in the first radial direction. The diameter of the large diameter portion 221 is made smaller than the distances between bottom faces of the first pipe holding portion 12 and the third pipe holding portion 81, and larger than the distances between the convex portions 14 and 83. The diameter of the narrow portion 222 may have the distances between the convex portions 14 and 83 or less.

Figure 11:
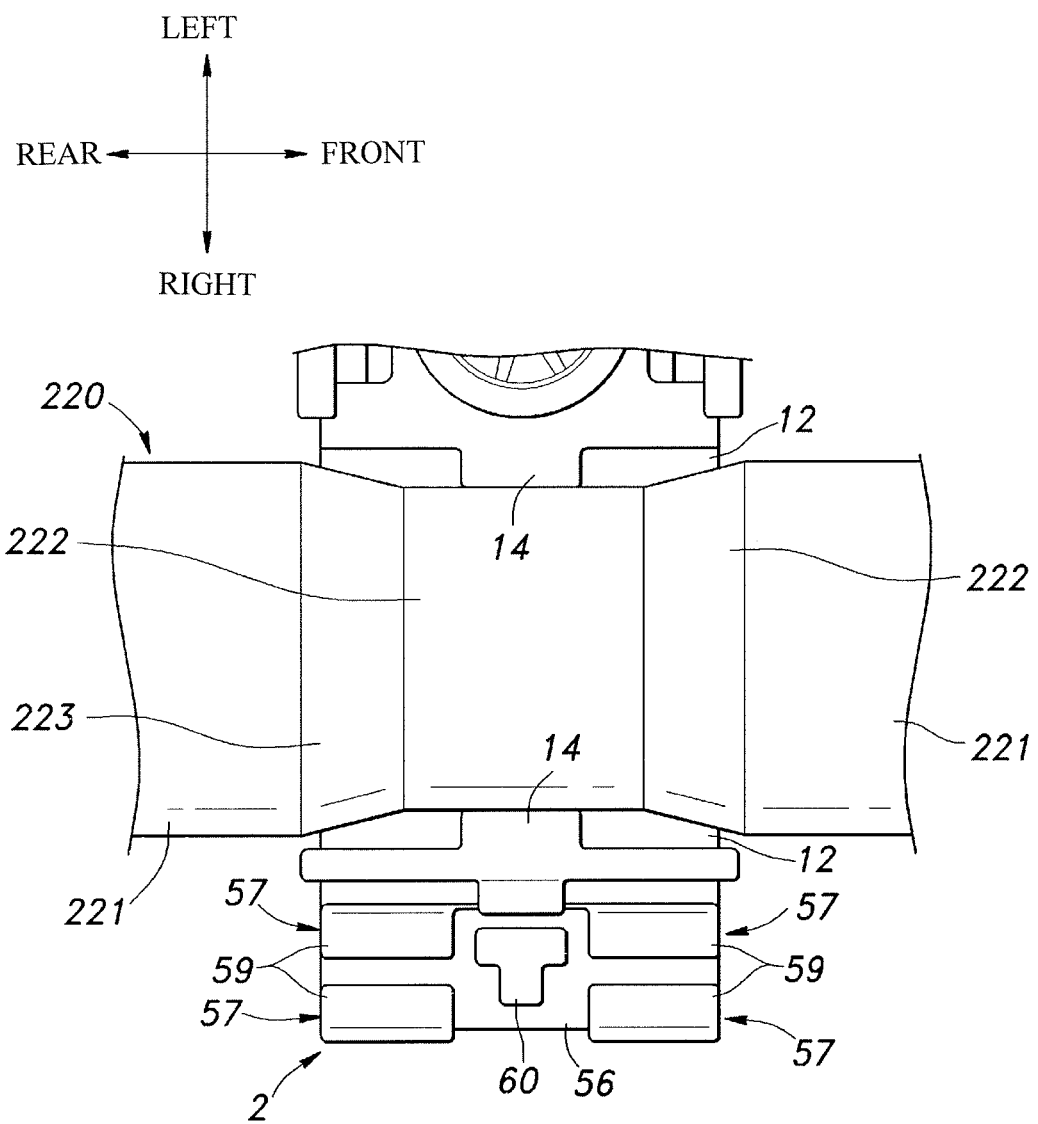
FIG. 11 is a plan view showing a positional relationship between the base member and the filler pipe of another embodiment.
Figure 12:
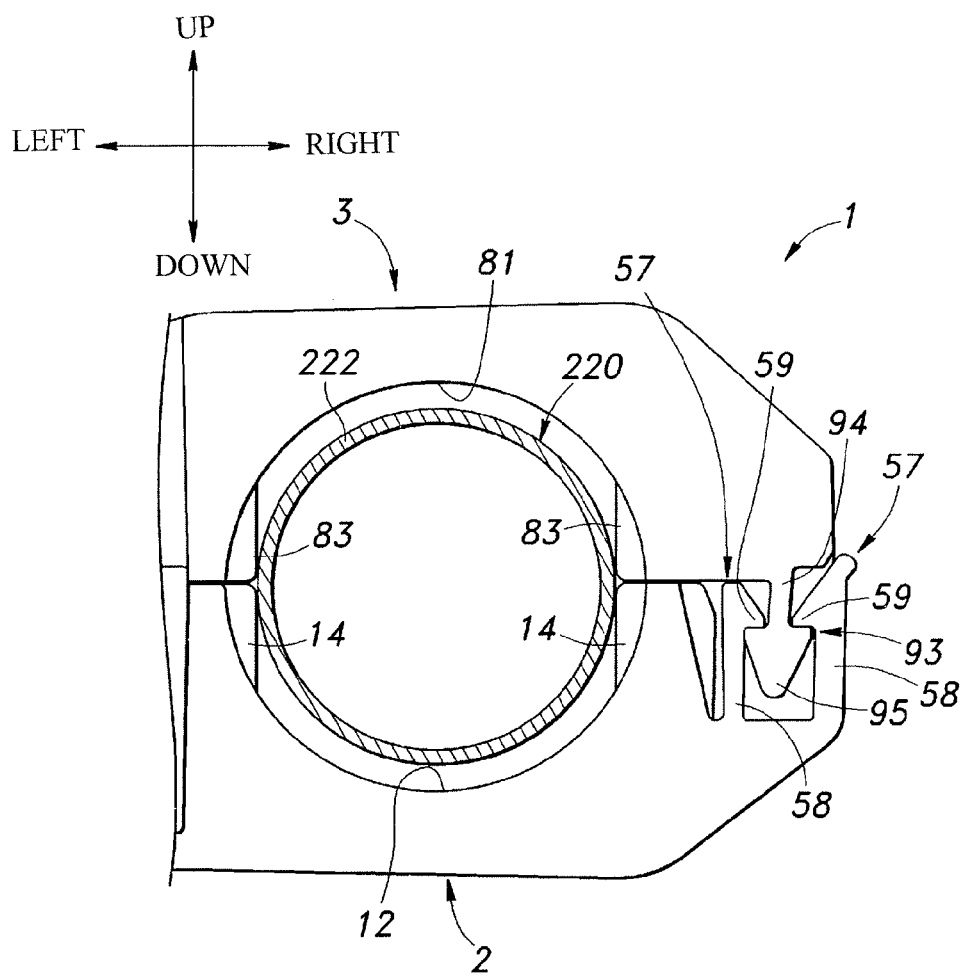
FIG. 12 is a side view showing the positional relationship between the base member and the filler pipe of another embodiment.

As shown in FIG. 11 and FIG. 12, the filler pipe 220 is supported in the first pipe holding portion 12 and the third pipe holding portion 81 in a shape in which right-and-left lateral portions of the narrow portion 222 contact with the convex portions 14 and 83. In FIG. 12, the filler pipe 220 is shown with a cross-sectional surface cut out in the narrow portion 222. There is formed a void between the up-and-down portions of the narrow portion 222 and the bottom faces of the first pipe holding portion 12 and the third pipe holding portion 81. Also, the filler pipe 220 can be displaced in the up-and-down direction inside the first pipe holding portion 12 and the third pipe holding portion 81.

When the filler pipe 220 is displaced in the thrust direction, the taper portion 223 of the filler pipe 220 presses the convex portions 14 and 83 so as to expand the convex portions 14 and 83 in the right-and-left direction. Incidentally, the diameter of the large diameter portion 221 is made smaller than the distances between the bottom faces of the first pipe holding portion 12 and the third pipe holding portion 81, so that the filler pipe 220 will never press the first pipe holding portion 12 and the third pipe holding portion 81 at a portion other than the convex portions 14 and 83, and the first pipe holding portion 12 and the third pipe holding portion 81 will never directly receive the load in the up-and-down direction from the filler pipe 220.

EXPLANATION OF SYMBOLS

1 . . . a pipe clamp, 2 . . . a base member (a first member), 3 . . . a lid member (a second member), 4 . . . a pin member, 11 . . . a main body portion, 12 . . . a first pipe holding portion (a first concave portion), 13 . . . a second pipe holding portion, 14 . . . convex portions, 36 . . . leg piece portions, 50 . . . a hinge axis portion, 57 . . . first elastic claws, 58 . . . first projecting piece portions, 59 . . . first claw portions, 60 . . . a key, 71 . . . a main body portion, 72 . . . a hinge bearing portion, 81 . . . a third pipe holding portion (a second concave portion), 82 . . . a fourth pipe holding portion, 83 . . . convex portions, 93 . . . second elastic claws, 94 . . . second projecting piece portions, 95 . . . second claw portions, 97 . . . a fitting hole, 200 and 220 . . . a filler pipe (a pipe), 201 . . . a breather pipe, 203 and 222 . . . a narrow portion, 205 . . . a vehicle body panel (a support member), 206 . . . a locking hole

What is claimed is:

1. A combination including a pipe and a clamp, comprising:

the pipe including a circular portion, and a narrow portion having a width narrower than that of the circular portion in a radial direction and formed at one portion in a longitudinal direction thereof; and the clamp for attaching the pipe to a support member, including a first member having a first concave portion extending in the longitudinal direction of the pipe and communicating with two end faces of the first member, and a first convex portion protruding from one portion of an inner surface of the first concave portion in a direction perpendicular to the narrow portion and formed at an intermediate portion in an extending direction thereof to abut against the narrow portion, the first member being adapted to be connected to the support member, and a second member having a base end hinge-connected to the first member, a front end selectively engaged with the first member, and a second concave portion extending in the longitudinal direction of the pipe and communicating with two end faces of the second member to face the first concave portion, the second concave portion defining a housing portion receiving the narrow portion together with the first concave portion and the first convex portion in a state wherein the front end is engaged with the first member, wherein the first concave portion, the first convex portion and the second concave portion support the narrow portion such that the radial direction is orthogonal to a direction in which the first member and the second member face each other, and the first concave portion and the second concave portion face the narrow portion through voids at two sides of the first convex portion in the longitudinal direction of the pipe.

2. A combination according to claim 1, wherein the first member includes a first elastic claw having a first projecting piece portion with flexibility provided in a portion facing an end of the second member to project to the second member, and a first claw portion provided in an end of the first projecting piece portion to project;

the second member includes a second elastic claw having a second projecting piece portion with flexibility provided in the end of the second member to project to the first member, and a second claw portion provided in an end of the second projecting piece portion to project; and the first claw portion of the first elastic claw and the second claw portion of the second elastic claw are mutually caught selectively, so that the second member is selectively engaged with the first member.

3. A combination according to claim 2, wherein the first member includes a plurality of first elastic claws along a direction corresponding to the longitudinal direction of the pipe; and the second member includes a plurality of second elastic claws in a portion corresponding to the plurality of first elastic claws.

4. A combination according to claim 3, wherein the second claw portion includes two surface portions protruding in two opposite directions from the end of the second projecting piece portion, to form two non-return faces; and each of the plurality of first elastic claws includes two first claw portions to sandwich each of the plurality of second elastic claws, and the two first claw portions are respectively caught on the two non-return faces of the second claw portion.

5. A combination according to claim 1, wherein a key is provided to project in either one of an end portion of the second member or a portion of the first member facing the end portion, and a fitting hole into which the key is fitted is formed on the other so that a movement between the first member and the second member is prevented when the key is inserted into the fitting hole.

6. A combination according to claim 1, wherein the second concave portion includes a second convex portion protruding from one portion of an inner surface of the second concave portion in the direction perpendicular to the narrow portion and formed at the intermediate portion in the extending direction thereof to abut against the narrow portion, and in the state wherein the front end of the second member is engaged with the first member, upper surface portions of the first convex portion and the second convex portion contact each other, and side surface portions of the first convex portion and the second convex portion extend linearly.

7. A combination according to claim 6, wherein the first concave portion includes a first pressing piece protruding inwardly from the inner surface thereof and having flexibility; and the second concave portion includes a second pressing piece protruding inwardly form the inner surface thereof and having flexibility, the first and second pressing pieces contacting the pipe to firmly attach the pipe to the first member and the second member.

8. A combination according to claim 1, wherein the narrow portion has two side portions extending in a vertical direction thereof, and an upper portion and a lower portion between the narrow portions respectively have outer circumferential faces with arc shapes same as those of the circular portion, a distance between the two side portions being less than a distance between the upper portion and the lower portion.

9. A combination according to claim 1, wherein the first member includes another first concave portion arranged apart from the first concave portion, connection holes, each being formed between the first concave portion and the another first concave portion, and openings, each being communicated with each of the connection holes;

the second member includes another second concave portion arranged apart from the second concave portion, and connection pieces, each projecting outwardly from the second member and having a first claw portion projecting outwardly from each of the connection pieces; and the connection pieces enter in the openings through the connection holes, respectively, such that the first member and the second member engage each other through the first claw portion of each of the connection pieces.

10. A combination according to claim 9, further comprising a pin member including third concave portions, wherein the first member includes a pin hole penetrating therethrough and formed between the connection holes, and leg piece portions protruding downwardly from the first member adjacent to the pin hole and having second claw portions inwardly protruding therefrom, and the second member includes a through hole penetrating therethrough and formed coaxially with the pin hole between the connection pieces; and when the pin member is inserted into the pin hole and the through hole, the second claw portions fit into the third concave portions, and when the pin member is further pushed downwardly relative to the pin hole and the through hole, the leg piece portions elastically deform outwardly in a radial direction thereof such that the first member is adapted to prevent from removing from the support member through the leg piece portions.

* * * * *